(12) United States Patent
Shimizu et al.

(10) Patent No.: US 8,111,470 B2
(45) Date of Patent: Feb. 7, 2012

(54) COMPOSITE LENS AND METHOD FOR MANUFACTURING THE SAME

(75) Inventors: Yoshiyuki Shimizu, Osaka (JP); Toshiaki Takano, Osaka (JP); Jun Murata, Osaka (JP); Kenji Inoue, Hyogo (JP)

(73) Assignee: Panasonic Corporation, Osaka (JP)

( * ) Notice: Subject to any disclaimer, the term of this patent is extended or adjusted under 35 U.S.C. 154(b) by 131 days.

(21) Appl. No.: 12/304,588

(22) PCT Filed: Jun. 6, 2007

(86) PCT No.: PCT/JP2007/061468
§ 371 (c)(1),
(2), (4) Date: Dec. 12, 2008

(87) PCT Pub. No.: WO2007/145117
PCT Pub. Date: Dec. 21, 2007

(65) Prior Publication Data
US 2009/0296239 A1  Dec. 3, 2009

(30) Foreign Application Priority Data
Jun. 13, 2006 (JP) .................................. 2006-163595

(51) Int. Cl.
*G02B 3/08* (2006.01)
(52) U.S. Cl. ........................................ 359/743; 359/741
(58) Field of Classification Search ........... 359/741–743
See application file for complete search history.

(56) References Cited

U.S. PATENT DOCUMENTS 6,238,600 B1 * 5/2001 Kuo et al. ................... 264/1.7
2008/0297920 A1 * 12/2008 Suzuki et al. ............... 359/716

FOREIGN PATENT DOCUMENTS

| JP | 2001-249208 | 9/2001 |
| JP | 2001-296414 | 10/2001 |
| JP | 2001296414 A * | 10/2001 |

OTHER PUBLICATIONS

International Search Report for corresponding Application No. PCT/JP2007/061468 mailed Sep. 18, 2007.
Form PCT/ISA/237.

* cited by examiner

*Primary Examiner* — William Choi
(74) *Attorney, Agent, or Firm* — Renner, Otto, Boiselle & Sklar, LLP

(57) ABSTRACT

The present invention relates to a composite lens and a method for manufacturing the same, particularly to a composite lens in which a second lens component is coupled to a first lens component at part of a first surface, and intends to improve optical characteristics. A composite lens (1) has a first lens component (10) and a second lens component (20). The first lens component (10) has a first surface including a first lens surface (13), a peripheral surface (15a) surrounding the first lens surface (13) and a ring surface (17a) included in the peripheral surface (15a) and surrounding the first lens surface (13), and a second lens surface (12) on the opposite side of the first lens surface (13). The second lens component (20) is coupled to the first lens component (10) at part of the first surface surrounded by the ring surface (17a). The ring surface (17a) is positioned on a portion of the first lens component protruding from a joint portion (14) between the first lens surface (13) and the peripheral surface (15a) in a first direction from the second lens surface (20) to the first lens surface (10) along an optical axis of the first lens component (10) and is exposed out of the second lens component (20).

16 Claims, 6 Drawing Sheets

(a)

(b)

COMPOSITE LENS AND METHOD FOR MANUFACTURING THE SAME

TECHNICAL FIELD

The present invention relates to a composite lens and a method for manufacturing the same, particularly to a composite lens including a first lens component and a second lens component coupled to part of a first surface of the first lens component.

BACKGROUND ART

Composite optical elements including two or more optical components coupled to each other have already been known. For example, in a composite optical element including two optical components, a second optical component is coupled to a surface of a first optical component. The composite optical element of this kind may be manufactured by molding the first optical component and then coupling the second optical component to the first optical component.

In the composite optical element of this kind, shapes of the optical components may have considerable effect on optical characteristics of the composite optical element. According to the disclosure of Patent Literature 1, in molding a composite optical element including two optical components, a pulse motor or a mechanism which is less likely to cause backlash (a pressing mechanism using a spring) is used to position the second optical component with respect to the first optical component and couple the second optical component to the first optical component.

[Patent Literature 1] Publication of Japanese Patent Application No. 2001-249208

DISCLOSURE OF THE INVENTION

Problem that the Invention is to Solve

An example of the composite optical element is a composite lens. The composite lens includes two or more lens components coupled to each other. A composite lens including two lens components coupled to each other may be molded by the method disclosed in Patent Literature 1.

In some cases, however, the method of Patent Literature 1 may fail to mold the second lens component into a desired shape. As a result, the composite lens cannot be provided with excellent optical characteristics.

The present invention has been achieved in view of the foregoing. An object of the invention may be improvement of lens characteristics of the composite lens.

Means of Solving the Problem

According to the present invention, a composite lens has a first lens component and a second lens component coupled to part of a first surface of the first lens component. The first lens component has the first surface including a first lens surface, a peripheral surface surrounding and joined to the first lens surface and a ring surface included in the peripheral surface and surrounding the first lens surface, and a second lens surface on the opposite side of the first lens surface. The second lens component is coupled to the first lens component at part of the first surface surrounded by the ring surface. The ring surface is positioned on a portion of the first lens component protruding from a joint portion between the first lens surface and the peripheral surface in a first direction from the second lens surface to the first lens surface along an optical axis of the first lens component and is exposed out of the second lens component.

According a method for manufacturing a composite lens of the present invention, a second lens component is coupled to a first lens component at part of a first surface to manufacture the composite lens. More specifically, the method includes the steps of: (a) preparing the first lens component having the first surface including a first lens surface, a peripheral surface surrounding and joined to the first lens surface and a ring surface included in the peripheral surface and surrounding the first lens surface, and a second lens surface on the opposite side of the first lens surface; (b) preparing a molding die having a molding surface for molding the second lens component and a peripheral region surrounding and joined to the molding surface; and (c) placing a lens material for forming the second lens component on the molding surface and pressing the first lens component against the lens material. The ring surface of the first lens component prepared in the step (a) is positioned on a portion of the first lens component protruding from a joint portion between the first lens surface and the peripheral surface in a first direction from the second lens surface to the first lens surface along an optical axis of the first lens component, and in the step (c), the first lens component is placed on the molding die so that the first lens surface comes into contact with the lens material, and then the first lens component is pressed against the lens material until the ring surface comes into contact with the peripheral region so that the lens material is coupled to part of the first surface of the first lens component surrounded by the ring surface.

Effect of the Invention

The present invention may be able to improve the optical characteristics.

Figure 1:
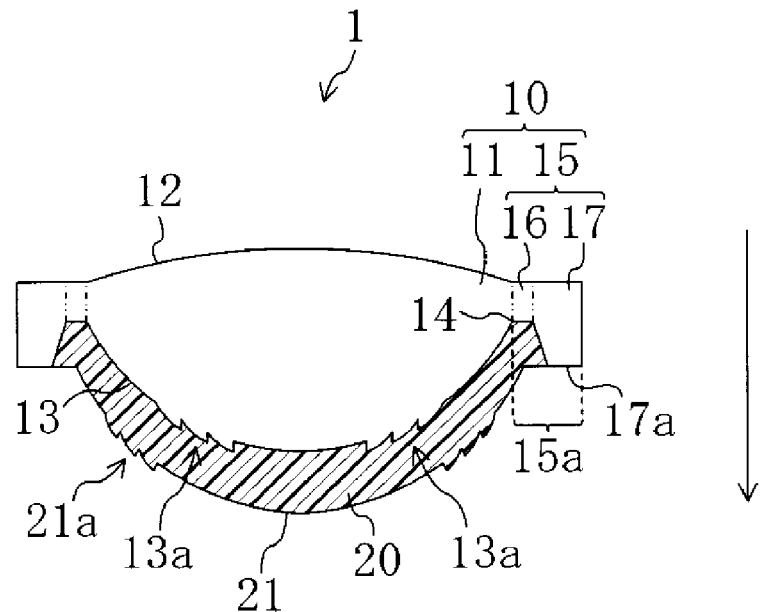
FIG. 1 is a sectional view illustrating the structure of a composite lens of Embodiment 1.

EXPLANATION OF REFERENCE NUMERALS 1, 2, 101, 201, 301, 401 Composite lens
6 Resin preform (lens material)
10, 30 First lens component
12 Lens surface (second lens surface)
13 Lens surface (first lens surface)
13a Uneven region
14 Joint portion 15a Peripheral surface
17a Ring surface
20 Second lens component
37a First surface
37b Second surface
50, 55 First lens piece
60, 65 Second lens piece
90 Lower molding die (molding die)
90a Molding surface
90b Peripheral region

BEST MODE FOR CARRYING OUT THE INVENTION

Hereinafter, embodiments of the present invention will be described with reference to the drawings. It should be noted that the present invention is not limited to the following embodiments.

Embodiment 1

Figure 2:
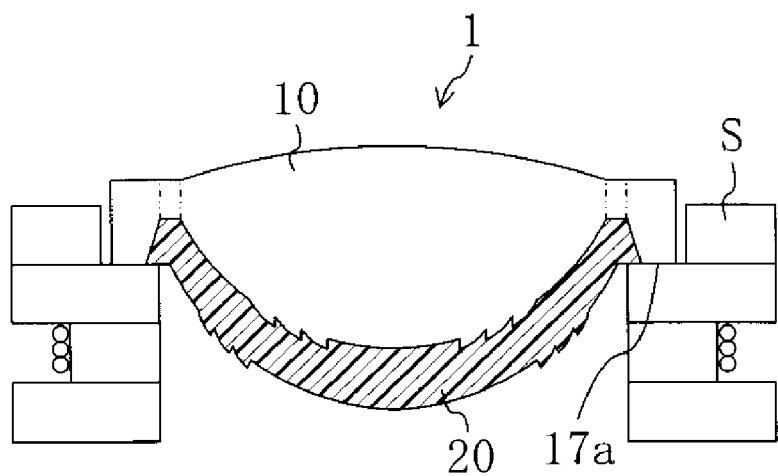
FIG. 2 is a sectional view illustrating the composite lens of Embodiment 1 attached to a lens barrel.

FIG. 1 is a schematic sectional view illustrating the structure of a composite lens 1 of Embodiment 1. FIG. 2 is a sectional view illustrating the composite lens 1 of Embodiment 1 attached to an optical system (e.g., a lens barrel) S.

The composite lens 1 of the present embodiment is a composite lens manufactured by coupling a second lens component 20 made of a resin to a first surface of a first lens component 10 made of glass. The first lens component 10 has a lens surface (first lens surface) 13 and a lens surface (second lens surface) 12. The lens surface 13 is on the opposite side of the lens surface 12 and is included in the first surface. The first surface includes, in addition to the lens surface 13, a peripheral surface 15a and a ring surface 17a. The peripheral surface 15a surrounds and is joined to the lens surface 13. The ring surface 17a is included in the peripheral surface 15a and positioned on a portion of the first lens component protruding from a joint portion 14 in a direction from the lens surface 12 to the lens surface 13 along an optical axis of the first lens component 10 (in a direction of an arrow shown in FIG. 1, hereinafter referred to as a first direction). The second lens component 20 is coupled to the first lens component 10 at part of the first surface surrounded by the ring surface 17a (hereinafter the part is referred to as a ring-inside part). Since the composite lens 1 has the ring surface 17a, the shape of the second lens component 20 (particularly the thickness of the second lens component 20) may be controlled in the process of forming the composite lens 1 by press-molding as described later.

Details of the composite lens 1 of the present embodiment are described below. The first lens component 10 includes a lens body 11 and a peripheral portion 15. The lens surface 12 and the lens surface 13 are the surfaces of the lens body 11. Almost every part of the lens surface 13 is smooth, except for an uneven region 13a. The uneven region 13a functions as a diffraction region having a sawtooth section. The smooth region and the uneven region 13a of the lens surface 13 have different optical powers. Therefore, lights of different wavelengths can be focused. The lens surface 12 is not provided with the uneven region.

The surface of the peripheral portion 15 has the peripheral surface 15a. The peripheral portion 15 includes a neck portion 16 and a mounting portion 17. The neck portion 16 is joined to the lens body 11 and extends in the direction substantially vertical to the optical axis of the lens body 11. The mounting portion 17 is coupled to the lens body 11 with the neck portion 16 interposed therebetween and protrudes in the first direction from the neck portion 16. The surface of the protruding portion is the ring surface 17a. The ring surface 17a extends in the direction substantially vertical to the optical axis of the lens body 11. Therefore, as shown in FIG. 2, the ring surface 17a functions as a mounting surface when the composite lens 1 is attached to an optical system (e.g., a lens barrel) S. The ring surface 17a is exposed out of the second lens component 20. That is, the ring surface 17a is not covered with a resin. Therefore, the composite lens 1 is attached to the lens barrel without misalignment of the optical axis.

The second lens component 20 is coupled to the ring-inside part of the first lens component 10 as described above and has a lens surface 21 on the opposite side of the surface thereof coupled to the first lens component 10. Similarly to the lens surface 13, the lens surface 21 includes an uneven region 21a which functions as a diffraction region just like the uneven region 13a.

As described above, the composite lens 1 of the present embodiment has the ring surface 17a. Therefore, the second lens component 20 may be molded into a controlled shape. As a result, not only the optical characteristics of the composite lens 1 (aberration and light-gathering power), but the optical characteristics of an optical system may be improved. Further, as described above, the composite lens 1 may be attached to an optical system 1 such as a lens barrel without misalignment of the optical axis.

The lens surfaces 13 and 21 include the uneven regions 13a and 21a, respectively. Therefore, the composite lens 1 is able to focus lights of different wavelengths.

FIGS. 3A to 3D are sectional views illustrating a method for molding the composite lens 1 of the present embodiment. After a first lens piece 50 is molded in the way shown in FIGS. 3A and 3B, a second lens piece 60 is coupled to the first lens piece 50 in the way shown in FIGS. 3C and 3D. The molding is specifically described below.

Figure 3:
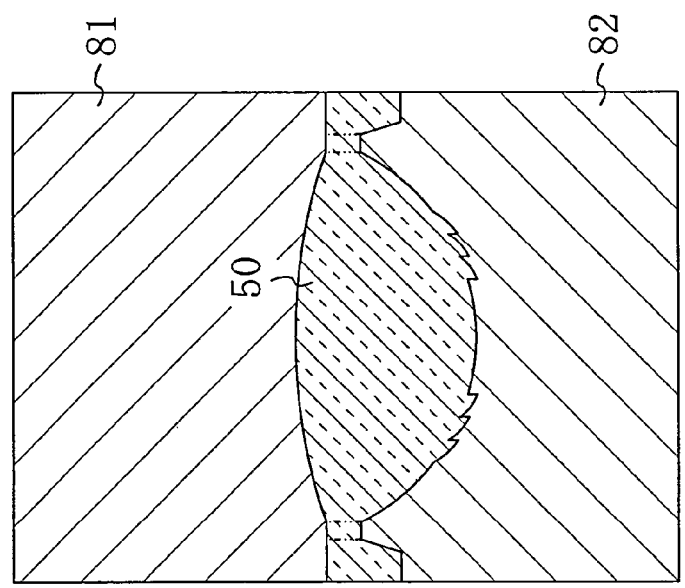
FIGS. 3A to 3D are sectional views illustrating a method of molding the composite lens of Embodiment 1.
Figure 3:
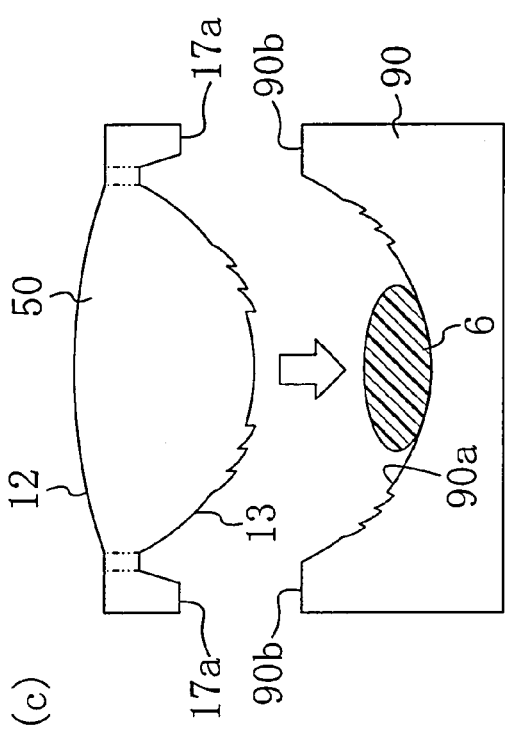
Figure 3:
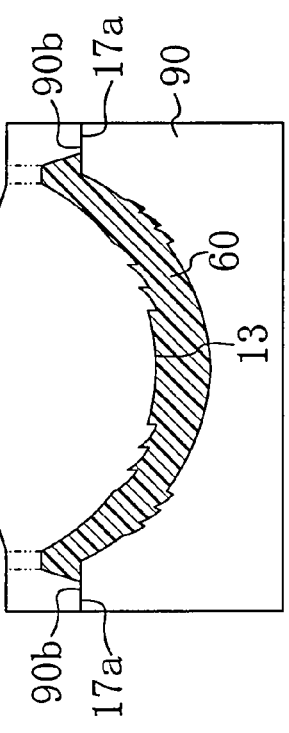

First, a molding die and a glass preform (not shown) for molding the first lens piece 50 are prepared. The molding die includes an upper molding die 81 and a lower molding die 82 as shown in FIG. 3A. The molding die is configured so that a cavity in the form of the first lens piece 50 is formed between the upper and lower molding dies 81 and 82 when they are combined. The glass preform is placed in the cavity, heated to the glass transition temperature or higher and pressed using the upper and lower molding dies 81 and 82. As a result, the first lens piece 50 shown in FIG. 3B is molded. The first lens piece 50 is used as the first lens component 10 and therefore has the ring surface 17a.

Then, a molding die and a resin preform 6 for molding the second lens piece 60 are prepared. The molding die includes a lower molding die 90 as shown in FIG. 3C. The lower molding die 90 is provided with a molding surface 90a and a peripheral region 90b. The molding surface 90a is used to mold the lens surface of the second lens piece 60. The peripheral region 90b surrounds and is joined to the molding surface 90a, and extends in the direction substantially vertical to the center axis of the molding surface 90a. The resin preform 6 in the molten state is placed on the molding surface 90a and the first lens piece 50 is placed on the lower molding die 90 so that the center axis of the molding surface 90a and the optical axis of the first lens piece 50 coincide with each other.

Then, the first lens piece 50 is pressed against the resin preform 6. As the first lens piece 50 applies pressure to the resin preform 6, the resin preform 6 flows from the molding surface 90a to the peripheral region 90b. Then, when the ring surface 17a of the first lens piece 50 comes into contact with the peripheral region 90b as shown in FIG. 3D, the pressing by the first lens piece 50 is stopped and the resin preform 6 is solidified. In this way, the composite lens 1 of the present embodiment is molded.

As described above, according to the method for manufacturing the composite lens 1 of the present embodiment, the first lens piece 50 is pressed against the resin preform 6 until the ring surface 17a comes into contact with the peripheral region 90b. Therefore, the shape of the second lens piece 60 (in particular the thickness of the second lens piece 60) is controlled in the manufacture of the composite lens 1.

The composite lens 1 may be mounted to optical devices such as imaging devices, illuminating devices and optical disc recording/reproducing devices. The imaging devices are devices for imaging a subject, e.g., digital still cameras and digital video cameras. The illuminating devices are devices for illuminating a target subject, e.g., projectors. The optical disc recording/reproducing devices are devices for recording/reproducing digital versatile discs, (DVD), compact discs (CD) and blu-ray discs® (BD®). In general, DVD, CD and BD use different wavelengths of light for recording/reproducing and have different thicknesses. Therefore, a twist may be required to the optical system so that the DVD, CD and BD are recorded and reproduced by a single optical disc recording/reproducing device. With use of the composite lens 1 of the present embodiment, the optical disc recording/reproducing device compatible with different kinds of information recording media may be realized.

The shapes of the first lens component, the second lens component and the uneven region are not limited to those described above. They may be shaped as described in the following first to fourth modifications.

(First Modification)

Figure 4:
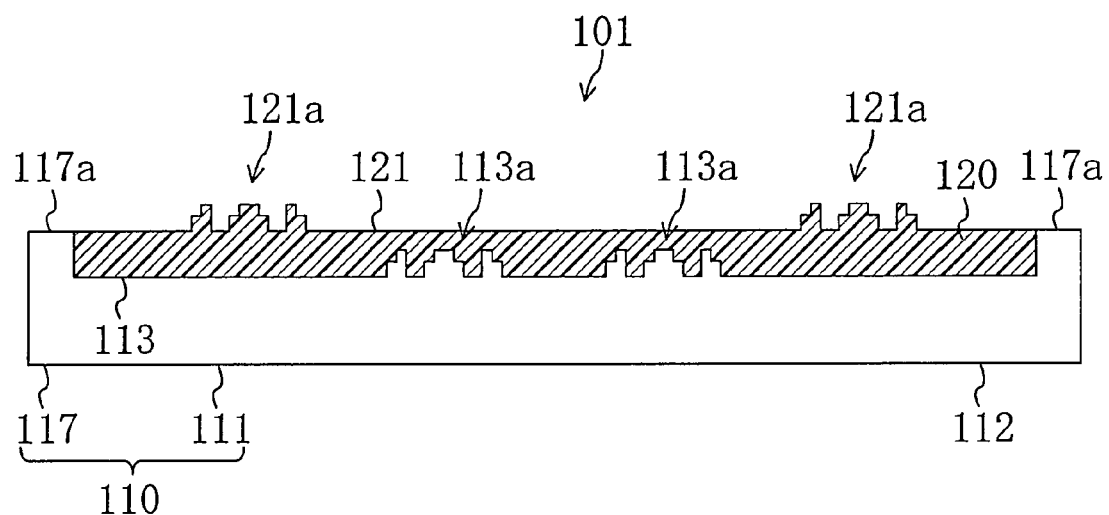
FIG. 4 is a sectional view illustrating the structure of a composite lens of a first modification of Embodiment 1.

FIG. 4 is a schematic sectional view illustrating a composite lens 101 of a first modification of Embodiment 1. According to the composite lens 101 of the present modification, a first lens component 110 is in the form of a flat plate. An uneven region 113a of the first lens component 110 and an uneven region 121a of a second lens component 120 are diffraction regions having a stepped section.

More specifically, the composite lens 101 of the present modification includes a first lens component 110 and a second lens component 120. The first lens component 110 includes a lens body 111 and a ring portion 117. A ring surface 117a is positioned on the ring portion 117 protruding from a lens surface 113 of the lens body 111 and exposed out of the second lens component 120.

(Second Modification)

Figure 5:
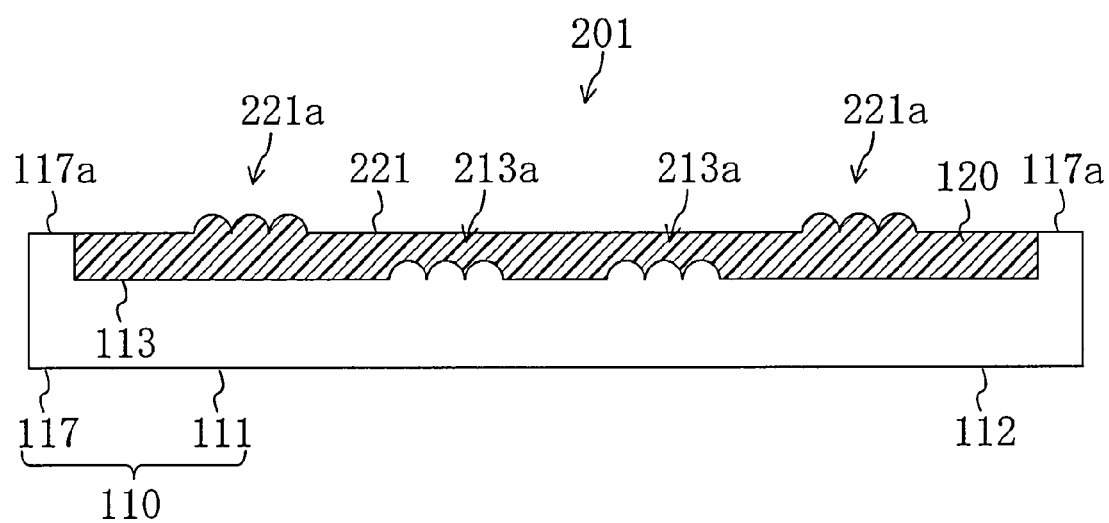
FIG. 5 is a sectional view illustrating the structure of a composite lens of a second modification of Embodiment 1.

FIG. 5 is a schematic sectional view illustrating a composite lens 201 of a second modification of Embodiment 1. The composite lens 201 of the present modification is substantially the same as the composite lens 101 of the first modification except that an uneven region 213a of the first lens component 110 and an uneven region 221a of the second lens component 120 are configured of lens array regions. More specifically, lens surfaces 113 and 221 are provided with an array of a plurality of concave lenses.

(Third Modification)

Figure 6:
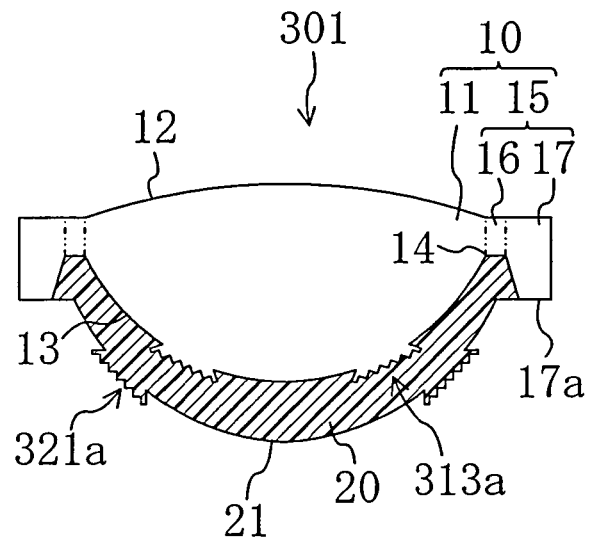
FIG. 6 is a sectional view illustrating the structure of a composite lens of a third modification of Embodiment 1.

FIG. 6 is a schematic sectional view of a composite lens 301 of a third modification of Embodiment 1. The composite lens 301 of the present modification is substantially the same as the composite lens 1 of Embodiment 1 except that an uneven region 313a of the first lens component 10 and an uneven region 321a of the second lens component 20 are phase changing regions having a stepped section. Accordingly, a light beam entering the uneven region 313a and a light beam entering the uneven region 321a experience phase change and then enter the composite lens 301.

(Fourth Modification)

Figure 7:
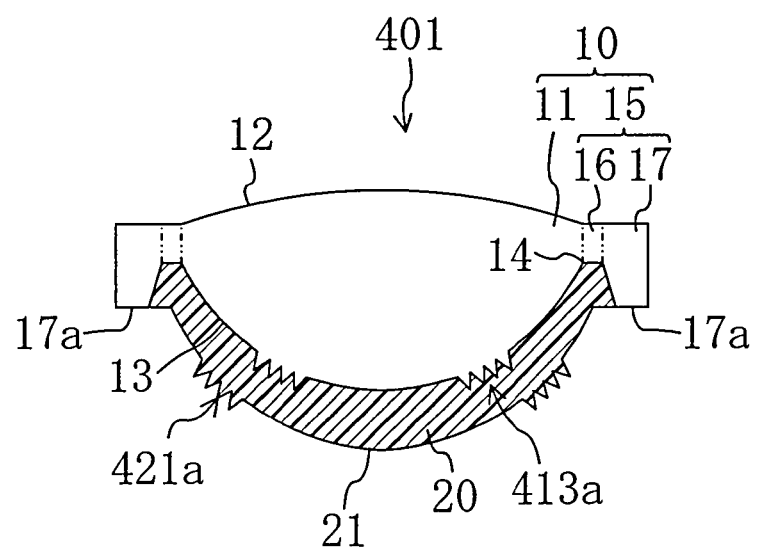
FIG. 7 is a sectional view illustrating the structure of a composite lens of a fourth modification of Embodiment 1.

FIG. 7 is a schematic sectional view illustrating a composite lens 401 of a fourth modification of Embodiment 1. The composite lens 401 of the present modification is substantially the same as the composite lens 1 of Embodiment 1 except that an uneven region 413a of the first lens component 10 and an uneven region 421a of the second lens component 20 are antireflective regions. More specifically, the lens surfaces 13 and 21 are provided with cone-shaped projections arranged at a pitch smaller than the wavelength of target light so that the reflection of the target light is blocked. If the cone-shaped projections on the uneven region 413a and those on the uneven region 421a are arranged at different pitches, the composite lens 401 may be able to prevent reflection of lights of different wavelengths.

Embodiment 2

Figure 8:
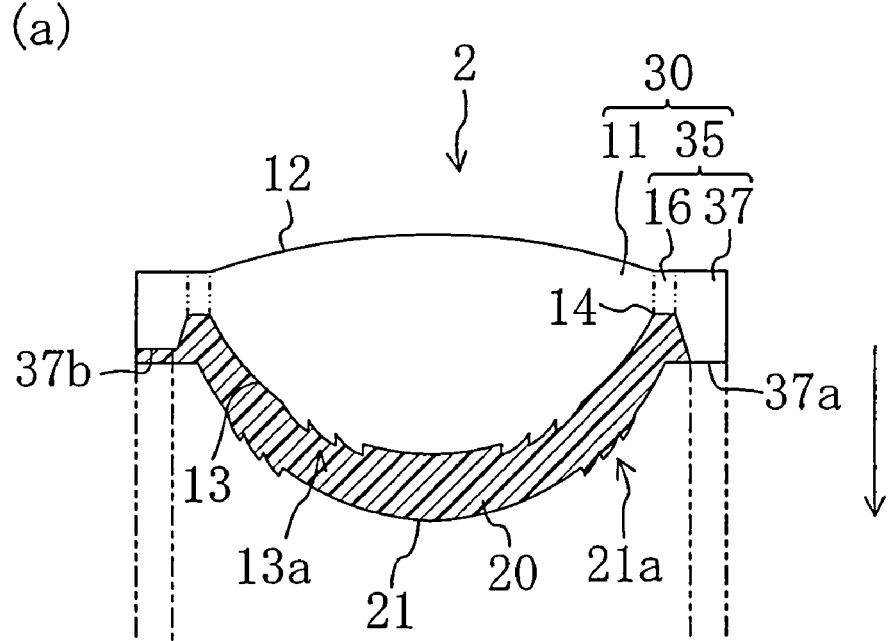
FIG. 8A is a sectional view illustrating the structure of a composite lens of Embodiment 2 and FIG. 8B is a plan view of the composite lens seen from below.
Figure 8:
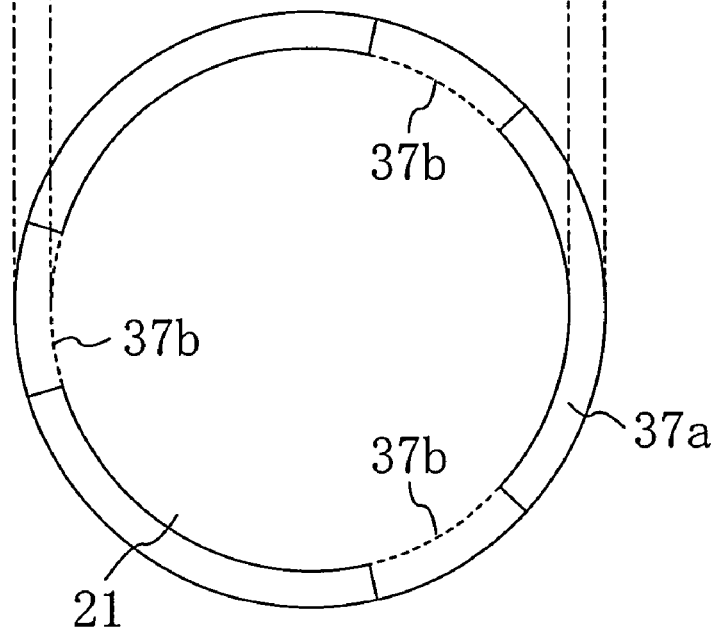

FIGS. 8A and 8B are schematic views illustrating the structure of a composite lens 2 of Embodiment 2. FIG. 8A is a schematic sectional view of the composite lens 2 and FIG. 8B is a plan view of the composite lens 2 seen from below in FIG. 8A. The composite lens 2 of the present embodiment includes first surfaces 37a and second surfaces 37b.

More specifically, on a ring surface of a first lens component 30, the first surfaces 37a and the second surfaces 37b are aligned in the circumferential direction of the ring surface. The first surfaces 37a are configured in the same manner as the ring surface of Embodiment 1, while the second surfaces 37b are positioned closer to a joint portion 14 than the first surfaces 37a in the first direction (the direction of an arrow shown in FIG. 8). That is, the surface of a neck portion 16, the second surfaces 37b and the first surfaces 37a are arranged in this order along the first direction. The second lens component is coupled not only to the ring-inside part, but to the second surfaces 37b of the first lens component 30. Since the composite lens 2 of the present embodiment is provided with the thus-configured second surfaces 37b, the resin preform flows to the second surface 37b in the process of press-molding as described later. As a result, cracking and chipping of the resin in a contracting state may be less likely to occur.

Figure 9:
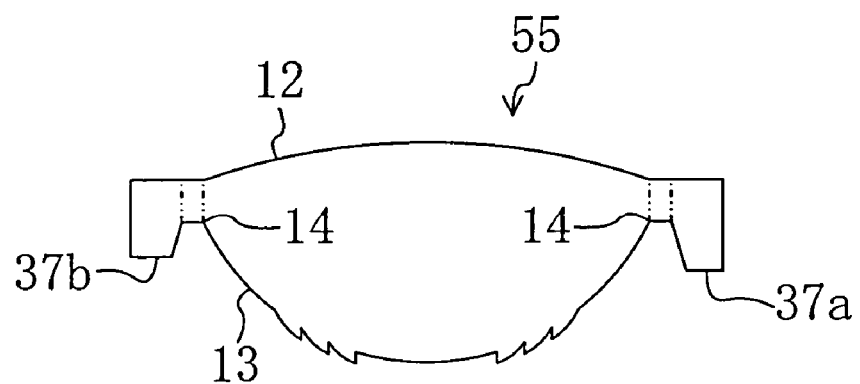
FIGS. 9A and 9B are sectional views illustrating part of a method of molding the composite lens of Embodiment 2.
Figure 9:
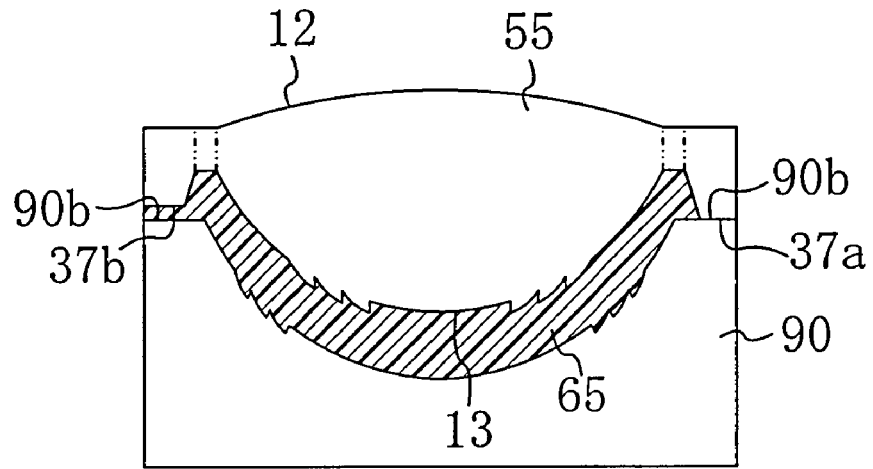

FIGS. 9A and 9B are schematic sectional views illustrating part of a method for manufacturing the composite lens 2 of the present embodiment. Hereinafter, difference from Embodiment 1 is described.

First, as shown in FIG. 9A, a first lens piece 55 is molded. The first lens piece 55 is used as the first lens component 30 and substantially the same as the first lens piece 50 of Embodiment 1 except that the first surfaces 37a and the second surfaces 37b are present on the ring surface and aligned in the circumferential direction of the ring surface. The second surfaces 37b are positioned closer to the joint portion 14 than the first surfaces 37a in the first direction. The thus-configured first lens piece 55 may be formed by press-molding as described in Embodiment 1 or may be formed by other molding method.

Then, a resin preform described in Embodiment 1 is placed on a molding surface of a molding die shown in FIG. 3C and the first lens piece 55 is placed on the resin preform.

Then, as shown in FIG. 9B, the first lens piece 55 is pressed against the resin preform until the first surfaces 37a of the first lens piece 55 come into contact with a peripheral region 90b of a lower molding die 90. The second surfaces 37b are closer to the joint portion 14 than the first surfaces 37a in the first direction as described above. Therefore, when the first surfaces 37a come into contact with the peripheral region 90b, the second surfaces 37b do not abut the peripheral region 90b but keep a gap from the peripheral region 90b. As the first lens piece 55 presses the resin preform, the resin preform in the molten state is coupled to the first lens piece 55 at part thereof inside the first surfaces 37a and at the same time, the resin preform flows from the molding surface 90a to the gap so that it is coupled to the first lens piece 55 at the second surfaces 37b. With the presence of the gap, an excess of the resin preform flows into the gap from the molding surface 90a. As a result, cracking and chipping of the resin as it is contracting may be less likely to occur.

Other Embodiments

Embodiments 1 and 2 of the present invention may be configured as follows.

The ring portion is joined to the lens body with the neck portion interposed therebetween. However, the ring portion may directly be joined to the lens body. That is, the entire peripheral surface may function as the ring surface. A different component may be joined to the periphery of the ring portion.

The lens surface of the first lens component is an aspherical surface. However, the lens surface may be a flat surface as described in the first and second modifications of Embodiment 1. Alternatively, the lens surface may be a spherical surface, a cylindrical surface, an oval spherical surface or a toric surface.

The second lens component is made of a resin. More specifically, the resin may be an energy curing resin or a thermoplastic resin. Examples of the energy curing resin include, for example, a thermosetting resin, a UV curing resin and an electron beam curing resin, which are cured upon application of certain energy (heat, UV light and electron beam). When the second lens component is molded using the energy curing resin, the resin in the molten state is placed on the molding surface of the lower molding die, the first lens component is pressed against the resin and the certain energy is applied to the resin. For example, when the second lens component is molded using the UV curing resin, the resin may be cured by applying UV light thereto. When the thermoplastic resin is used to mold the second lens component, the resin in the molten state is placed on the molding surface of the lower molding die, the first lens component is pressed against the resin, and then the resin is cooled.

The materials of the first lens component and the second lens component are not limited to those described above. Both of the first and second lens components may be made of glass, both of the first and second lens components may be made of a resin, or the first lens component may be made of a resin and the second lens component may be made of glass. Impurities that do not have any effect on the optical characteristics may be mixed to the material.

The uneven region is formed on the lens surfaces of the first and second lens components. However, the uneven region may be formed only on the lens surface of the first lens component or only on the lens surface of the second lens component. Two or more different uneven regions may be formed on each of the lens surfaces of the first and second lens components.

The first lens component is preferably formed by press-molding. However, it may be formed by other methods than the press-molding (e.g., polishing or grinding). Different from the polishing or grinding, the press-molding makes it possible to form the first lens component by a single molding process. Even if the lens surface is an aspherical surface as described in Embodiments 1 and 2, the first lens component may be formed relatively easily. Likewise, the second lens component is also preferably formed by press-molding. However, the second lens component may be formed by other methods than the press-molding (e.g., by applying the resin preform on the first lens component).

The second lens piece is formed using a molten resin preform. However, a resin preform which is liquid at room temperature may be used to form the second lens piece. Further, a resin preform which is solid at room temperature may be placed on the lower molding die and molten by heating or UV light application to form the second lens piece.

Regarding Embodiment 2, the number of the second surfaces is not limited to that shown in FIG. 8B. Further, in Embodiment 2, the ring surface includes the first and second surfaces. However, a through hole may be formed in part of the ring portion to penetrate the ring portion in the direction of the ring diameter.

INDUSTRIAL APPLICABILITY

As described above, the present invention may be mounted not only on optical disc recording/reproducing devices, but also on imaging devices (digital still cameras and digital vide cameras) and display devices (projectors and the like).

The invention claimed is:

1. A composite lens comprising a first lens component and a second lens component coupled to part of a first surface of the first lens component, wherein the first lens component has the first surface including a first lens surface, a peripheral surface surrounding and joined to the first lens surface and a ring surface included in the peripheral surface and surrounding the first lens surface, and a second lens surface on the opposite side of the first lens surface, the second lens component has an outer surface on the opposite side of the first lens surface, is coupled to the first lens component at part of the first surface surrounded by the ring surface, and the ring surface is positioned on a portion of the first lens component protruding from a joint portion between the first lens surface and the peripheral surface in a first direction from the second lens surface to the first lens surface along an optical axis of the first lens component and is exposed out of the second lens component, wherein the outer surface has a curved surface shape, wherein the ring surface includes a first ring surface portion and a second ring surface portion positioned closer to the joint portion than the first ring surface portion in the first direction, the first and second ring surface portions being arranged in a circumferential direction of the ring surface, and the first ring surface portion is exposed out of the second lens component and at least part of the second ring surface portion is coupled to the second lens component.

2. The composite lens of claim 1, wherein the outer surface has a convex surface shape.

3. A composite lens comprising a first lens component and a second lens component coupled to part of a first surface of the first lens component, wherein the first lens component has the first surface including a first lens surface, a peripheral surface surrounding and joined to the first lens surface and a ring surface included in the peripheral surface and surrounding the first lens surface, and a second lens surface on the opposite side of the first lens surface, the second lens component has an outer surface on the opposite side of the first lens surface, is coupled to the first lens component at part of the first surface surrounded by the ring surface, and the ring surface is positioned on a portion of the first lens component protruding from a joint portion between the first lens surface and the peripheral surface in a first direction from the second lens surface to the first lens surface along an optical axis of the first lens component and is exposed out of the second lens component, wherein the outer surface has a curved surface shape, wherein the first lens surface includes an uneven region.

4. The composite lens of claim 3, wherein the uneven region is at least one of a diffraction region, a lens array region including a plurality of concave or convex lens surfaces, a phase changing region and an antireflective region.

5. The composite lens of claim 3, wherein the outer surface has a convex surface shape.

6. The composite lens of claim 5, wherein the outer surface has a convex surface shape.

7. A method for manufacturing a composite lens by coupling a second lens component to a first lens component at part of a first surface, the method comprising the steps of:

(a) preparing the first lens component having the first surface including a first lens surface, a peripheral surface surrounding and joined to the first lens surface and a ring surface included in the peripheral surface and surrounding the first lens surface, and a second lens surface on the opposite side of the first lens surface;

(b) preparing a molding die having a molding surface for molding the second lens component and a peripheral region surrounding and joined to the molding surface; and (c) placing a lens material for forming the second lens component on the molding surface and pressing the first lens component against the lens material, wherein the ring surface of the first lens component prepared in the step (a) is positioned on a portion of the first lens component protruding from a joint portion between the first lens surface and the peripheral surface in a first direction from the second lens surface to the first lens surface along an optical axis of the first lens component, and in the step (c), the first lens component is placed on the molding die so that the first lens surface comes into contact with the lens material, and then the first lens component is pressed against the lens material until the ring surface comes into contact with the peripheral region so that the lens material is coupled to the first lens component at part of the first surface surrounded by the ring surface, wherein the molding surface has a curved surface shape.

8. The method of claim 7, wherein the ring surface of the first lens component prepared in the step (a) includes a first ring surface portion and a second ring surface portion positioned closer to the joint portion than the first surface in the first direction, in the step (c), the first lens component is pressed against the lens material so that the first ring surface portion comes into contact with the peripheral region of the molding die and the lens material is coupled to the first lens component at the second ring surface portion.

9. The method of claim 7, wherein the molding surface has a concave surface shape.

10. A composite lens comprising a first lens component and a second lens component coupled to part of a first surface of the first lens component, wherein the first lens component has the first surface including a first lens surface, a peripheral surface surrounding and joined to the first lens surface and a ring surface included in the peripheral surface and surrounding the first lens surface, and a second lens surface on the opposite side of the first lens surface, the second lens component has an outer surface on the opposite side of the first lens surface, is coupled to the first lens component at part of the first surface surrounded by the ring surface, and the ring surface is positioned on a portion of the first lens component protruding from a joint portion between the first lens surface and the peripheral surface in a first direction from the second lens surface to the first lens surface along an optical axis of the first lens component and is exposed out of the second lens component, wherein the outer surface has a curved surface shape, wherein the outer surface includes an uneven region.

11. The composite lens of claim 10, wherein the outer surface has a convex surface shape.

12. A composite lens comprising a first lens component and a second lens component coupled to part of a first surface of the first lens component, wherein the first lens component has the first surface including a first lens surface, a peripheral surface surrounding and joined to the first lens surface and a ring surface included in the peripheral surface and surrounding the first lens surface, and a second lens surface on the opposite side of the first lens surface, the second lens component has an outer surface on the opposite side of the first lens surface, is coupled to the first lens component at part of the first surface surrounded by the ring surface, and the ring surface is positioned on a portion of the first lens component protruding from a joint portion between the first lens surface and the peripheral surface in a first direction from the second lens surface to the first lens surface along an optical axis of the first lens component and is exposed out of the second lens component, wherein the outer surface has a curved surface shape, wherein the first lens surface has a convex surface shape.

13. The composite lens of claim 12, wherein the outer surface has a convex surface shape.

14. A composite lens comprising;

a first lens component having a first surface including a first lens surface and a outer ring surface surrounding the first lens surface, and a second lens surface on the opposite side of the first lens surface, and a second lens component coupled to the first lens component at part of the first surface, and having a outer surface which has curved surface shape on the opposite side of the first lens surface, wherein the ring surface is exposed in a first direction from the second lens surface to the first lens surface along an optical axis of the first lens component, the first lens surface includes an uneven region, and the uneven region is at least one of a diffraction region, a lens array region including a plurality of concave or convex lens surfaces, a phase changing region and an antireflective region.

15. A composite lens comprising;
a first lens component having a first surface including a first lens surface and a outer ring surface surrounding the first lens surface, and a second lens surface on the opposite side of the first lens surface, and
a second lens component coupled to the first lens component at part of the first surface, and having a outer surface which has curved surface shape on the opposite side of the first lens surface, wherein
the ring surface is exposed in a first direction from the second lens surface to the first lens surface along an optical axis of the first lens component,
the outer surface includes an uneven region, and
the uneven region is at least one of a diffraction region, a lens array region including a plurality of concave or convex lens surfaces, a phase changing region and an antireflective region.

16. A composite lens comprising;
a first lens component having a first surface including a first lens surface and a outer ring surface surrounding the first lens surface, and a second lens surface on the opposite side of the first lens surface, and
a second lens component coupled to the first lens component at part of the first surface, and having a outer surface which has curved surface shape on the opposite side of the first lens surface, wherein
the ring surface is exposed in a first direction from the second lens surface to the first lens surface along an optical axis of the first lens component,
the first lens surface has a convex surface shape, and
the outer surface has a convex surface shape.

* * * * *